US009881296B1

(12) United States Patent
Paulin et al.

(10) Patent No.: US 9,881,296 B1
(45) Date of Patent: *Jan. 30, 2018

(54) PROCESSING A MOBILE PAYLOAD (71) Applicant: Square, Inc., San Francisco, CA (US)

(72) Inventors: Alan Paulin, San Francisco, CA (US); Peter Westen, San Francisco, CA (US); Shawn Welch, San Francisco, CA (US); Daniel Federman, San Francisco, CA (US); Michael Gershunovsky, San Francisco, CA (US); Ayokunle Omojola, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/282,833

(22) Filed: Sep. 30, 2016

Related U.S. Application Data

(60) Provisional application No. 62/393,504, filed on Sep. 12, 2016.

(51) Int. Cl.
*G06Q 20/32* (2012.01)
*G06Q 20/00* (2012.01)
(Continued)

(52) U.S. Cl.
CPC ....... *G06Q 20/3223* (2013.01); *G06Q 20/102* (2013.01); *G06Q 20/3221* (2013.01);
(Continued)

(58) Field of Classification Search
None
See application file for complete search history.

(56) References Cited

U.S. PATENT DOCUMENTS 7,003,493 B2 2/2006 Weichert et al.
2004/0148252 A1 7/2004 Fleishman
(Continued)

FOREIGN PATENT DOCUMENTS

EP 0 913 789 A2 * 5/1999 ............. G06F 17/60

OTHER PUBLICATIONS

Non-Final Office Action dated Feb. 2, 2017, for U.S. Appl. No. 15/282,933, of Paulin, A., et al., filed Sep. 30, 2016.
(Continued)

*Primary Examiner* — Robert R Niquette
*Assistant Examiner* — Joseph W King
(74) *Attorney, Agent, or Firm* — Eric L. Sophir; Dentons US LLP (57) ABSTRACT

Disclosed herein are systems and methods for processing a payment request. A mobile device associated with a payor may generate a user interface having two screen portions. The first screen portion may be configured to display received and sent messages and further configured to receive a command to transmit a message. The second screen portion may be configured to access a third-party application and configured to populate a new message with a payload. The mobile device may receive an inputted amount in the second screen portion representing the payment amount. The mobile device may transmit a request including the payor's identification and the payment amount to a third-party Payment Processing System (PPS) and receive a payload from the PPS. The mobile device may populate and transmit a message to the recipient that contains the payload.

26 Claims, 7 Drawing Sheets

(51) Int. Cl.
*G06Q 20/10* (2012.01)
*H04L 12/58* (2006.01)
*G06Q 40/00* (2012.01)

(52) U.S. Cl.
CPC .......... *G06Q 40/12* (2013.12); *H04L 51/046* (2013.01); *H04L 51/10* (2013.01)

(56) References Cited

U.S. PATENT DOCUMENTS

2007/0255653 A1   11/2007  Tumminaro et al.
2010/0062796 A1*  3/2010  Hayton ............. H04M 1/72544
                                                   455/466
2014/0337235 A1*  11/2014  Van Heerden ......... G06Q 20/10
                                                      705/71

OTHER PUBLICATIONS

Final Office Action dated Jun. 5, 2017, for U.S. Appl. No. 15/282,933, of Paulin, A., et al., filed Sep. 30, 2016.
Advisory Action dated Aug. 15, 2017, for U.S. Appl. No. 15/282,933, of Paulin, A, et al., filed Sep. 30, 2016.
Notice of Allowance dated Sep. 25, 2017, for U.S. Appl. No. 15/282,933, of Paulin, A, et al., filed Sep. 30, 2016.

* cited by examiner

PROCESSING A MOBILE PAYLOAD

CROSS-REFERENCE TO RELATED APPLICATION

This application claims priority to U.S. Provisional Patent Application Ser. No. 62/393,504, filed on Sep. 12, 2016, which is hereby incorporated by reference in its entirety.

BACKGROUND

Users can send money through variety of online services, such as online checking accounts or online payment methods. Using these online payment methods may be a complex and time-consuming process that often involves inputting various financial information (e.g., bank account numbers or a routing number), identification verifications (e.g., social security or a home address), and information to identify the recipient at the time of the payment (e.g., an address or account number). In many instances, the payor's knowledge regarding a recipient may be limited to a mobile number, therefore providing financial information or other identification verifications may be impossible. Additionally, while a payor is communicating with a recipient using a messaging or social networking application on a computing device (e.g., mobile phone), the payor may be required to execute a new application on the computing device in order to send a payment to a recipient. Using conventional systems, it can be challenging to transfer funds between individuals through non-conventional data transfer platforms.

DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the present disclosure.

DESCRIPTION

Modern telecommunications systems offer several ways for mobile devices to communicate with one another instantly, using a variety of protocols, such as simple message service (SMS) and multimedia message service (MMS), as well as other instant communications platforms hosting real-time inter-device communications. But SMS and other simple or plain text communications protocols utilized by cellular telephones are often limited in their capabilities beyond sharing simple text messages, graphics, or short videos. As such, conventional messaging between mobile devices is not a useful mechanism for transferring funds between individuals, even though the instant communications would make this medium for communications between devices a potential candidate for real-time or real-time transfer of funds or other data.

Additionally, recent technological advances have resulted in an increase in digital currency and have inevitably created new technological challenges regarding transactions involving such currencies. As a result, a new type of problem exists: how to send digital money to another with ease and security. Current payment methods and processes for mobile devices provide little flexibility and ease for sending payments between mobile devices, such as online funds transfers, ACH payments, and the like. As a result there is a need for a technical solution for this problem. The embodiments described herein aim to provide a method and a system for a secure and easy payments using a mobile device and existing telecommunications and network (IP-based) infrastructures.

Until recently, however, existing mobile telecommunications technologies have been limited by the outmoded protocols (e.g., SMS, MMS) and the device applications that interact with these protocols (e.g., text message applications). The devices were therefore only capable of transmitting simple messages or graphics (e.g., GIF images) from one device to the other. There would have been no means of conducting a sophisticated fund transfer. New communications technologies are being introduced, whereby the communications protocols permit more sophisticated data transfers and the device applications may facilitate more complex interactions between the devices through, what users would perceive as, a conventional instantaneous text messaging medium. The embodiments disclosed herein provide systems and methods that, through interconnected mobile devices, marry the financial institution networked systems that host and facilitate funds transfers between large scale financial systems, together with an instantaneous messaging host system that facilitates data transfers between the mobile devices through one or more protocols.

As an example, in some embodiments, a payment processing server is configured to receive a payment request from a mobile device. The payment processing server receives a request to send a payment (e.g., a payment request) from a payor's mobile device's instant messaging application. The payment request may contain information, such as an amount to be paid and identification of the payor. Often the messaging system keeps the recipient's device information or identifier (e.g., phone number, MAC address, IP address) secret from the payor's device and/or the payment processing server; as such, the payment processing server may not receive nor transmit any identification data associated with the recipient. The payment processing server may communicate with a financial account held at a financial institution, through which the payment processing server may decrement a payor's financial account, create an escrow account, and/or increment the balance value based on the payment request. The payment processing server may also generate a token string data regarding the escrow account such as an alphanumeric string based on a random value generator. In some instances, the payment processing server may further generate and return to the payor's mobile device various types of information transmitted via the messaging service, such as a payload with a hyperlink containing the token string, an image associated with the amount of the payment request, and a text instructions. The payment processing server may transmit the payload to the payor's mobile device's instant messaging application. The payment processing server may further pay the recipient, by incrementing recipient's financial account, as a result of the recipient receiving the payload and activating the hyperlink of the payload.

In some embodiments, a messaging service server facilitates mobile device-to-mobile device funds transfers or payments through a messaging server hosted by the messaging service through a third-part application hosted by the mobile device and associated with the payment processing server. In operation, a mobile device may generate a user interface (UI) that comprises a first screen portion that displays and transmits text messages or other types of data via a hosting instant messaging application. The UI may also comprise a second screen portion to access a third-party application executed locally on the mobile device, and is associated with the payment processing server. The second portion of the UI allows the user to input various options that are then sent to the payment processing server as instructions to populate a payload and receive an inputted amount in the second screen portion (for the payload). The mobile device may transmit the payment request and identification of the payor to the payment service system and receive a payload comprising a hyperlink containing a token string, an image based on the amount of payment request, and text instructions for the payment request. The mobile device may further populate a message to the recipient comprising the payload where the payload does not include information regarding the recipient. The mobile device may also transmit the payload to the recipient via an instant message.

A recipient's mobile device may receive a message containing a payload from a mobile device network, as prompted by a payor's mobile device. The payload may comprise a hyperlink that contains a token string, an image based on a payment request amount, and text instructions to the recipient. When the recipient activates the payload, the recipient mobile device transmits instructions to a payment processing server to release funds to a designated financial institution account system. Activation of the payload occurs, in some embodiments, when the recipient activates a hyperlink that contains a token contained within the payload, by clicking on the hyperlink. The payment processing server confirms the activation of the payload and the amount of the payment in a database of the payment processing server, and then the payment processing server facilitates the transaction by releasing the funds to the designated financial institution account system.

The present disclosure is described in detail with references to embodiments illustrated in the drawings. Other embodiments may be used or other changes may be made without departing from the spirit or scope of the present disclosure. The illustrative embodiments described in the detailed description are not meant to be limiting of the subject matter presented here. Various embodiments will now be described in further detail. The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments may include many other obvious features not described in detail herein. Additionally, some well-known structures or functions may not be shown or described in detail below, to avoid unnecessarily obscuring the relevant description.

Figure 1:
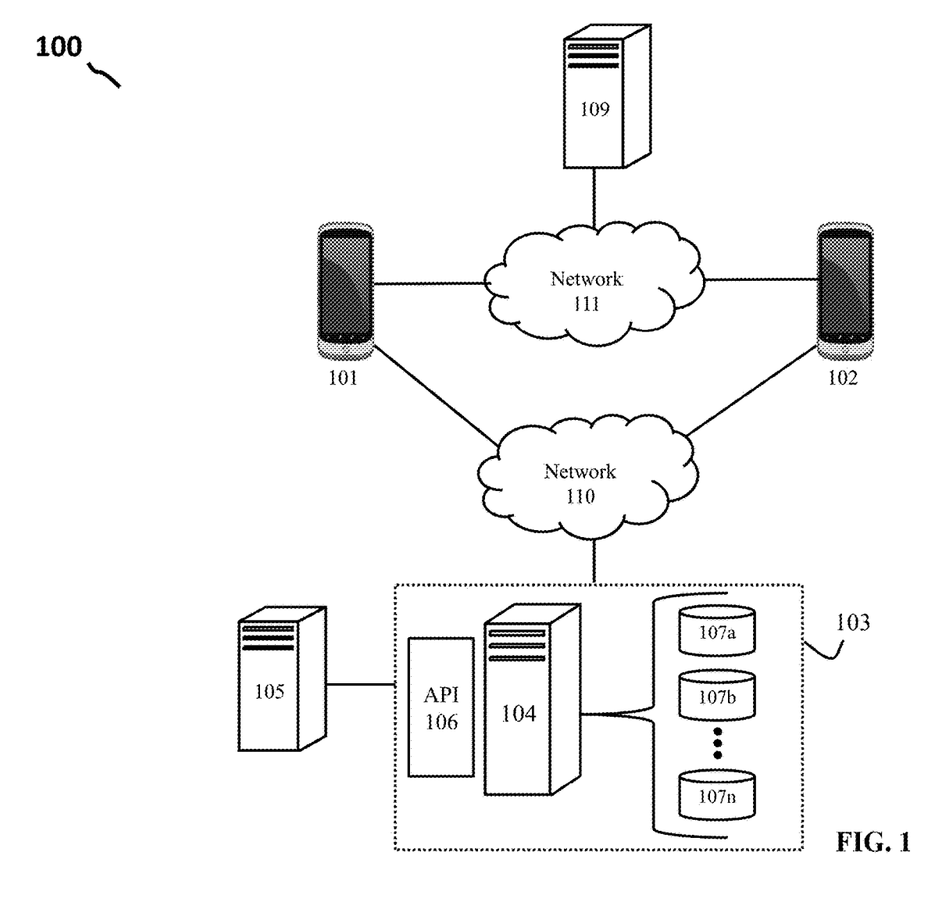
FIG. 1 illustrates an example of a system for processing mobile payments, according to an embodiment.

FIG. 1 illustrates an embodiment of a system 100 that includes several servers that handle various steps in the system 100 for processing a payment request from a mobile device. Note that FIG. 1 illustrates a two-party scheme in which a payor requests payment to be sent to a recipient. Other embodiments of this disclosure may similarly function with different schemes involving more than two parties.

A server 104 may be positioned between a mobile device 101, a mobile device 102, and a system of record server 105. Server 104 is part of a Payment Processing System (PPS) 103, which may also include an Application Programming Interface (API) 106 and one or more databases 107a-107n. Server 104 may use API 106 to communicate with mobile devices belonging to the payor or the recipient over network 110 (the PPS network). Databases 107a-107n may include information such a user profile, account numbers, and balances. In the exemplary system 100 see in FIG. 1, the server 104 may receive transmissions regarding payment requests that occur between a payor using mobile device 101, a recipient using mobile device 102, and system of record server 105. In an embodiment, upon receiving a payment request from the payor and generating a payload, server 104 may forward the transaction to system of record server 105 that is associated with a financial institute. In another embodiment, server 104 may directly contact the financial institute in order to facilitate the payment request and transaction.

System of record server 105 may be hosted by a financial institute or a third party that provides a service to the financial institute. The system of record server 105 may maintain information regarding the balance of an account maintained by the payor or the recipient at the financial institute. Certain parties, such as the account owner, the merchant, the issuer processor, or the PPS 103, may assume certain risks that an account holder does not have sufficient funds to fund a transaction, until the system of record server 105 authorizes the transaction. Upon receiving a payment request, server 104 may forward associated information to system of record server 105, which maintains an account corresponding to the balance of the payor. In an embodiment, the financial institute may also generate an authorization response to forward to the system of record server 105, back through other devices in the payment stream and eventually to the server 104 to confirm that the payor or recipient may complete the payment transaction. Server 104 may either receive authorization from the financial institute or create a custom authorization or anti-fraud procedure in order to authorize the payment requests.

Server 104 may also be in communication, over networks 110, with mobile device of the payor and the recipient. Network 110 or 111 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 110 may also include a number of different types of networks, such as, for example, an intranet, a local area network (LAN), or a wide area network (WAN). Payor's and recipient's mobile devices (mobile devices 101 and 102) are illustrated in FIG. 1 as smartphones, but may be any computing device, such as any mobile phone, tablet, smart watch, personal data assistant, gaming console, or personal computer.

In an embodiment, mobile device for the payor and the mobile device for the recipient may be in direct communication in order to transmit a payment request, payload, token, or other financial information associated with the payment request through variety of methods and in particular, text or instant messaging. For example, a mobile device server 109 hosts a messaging service. The mobile device server 109 may generate instructions to mobile device 101 to populate a user interface and generate a payment request. The mobile device server 109 may also, utilizing network 111 (the mobile device network), communicate that payment request and other relevant information to mobile device 102 via text message and instant messaging application. As described below, the mobile device server 109 and PPS 103 may collaborate in order to generate a payment request.

Figure 2:
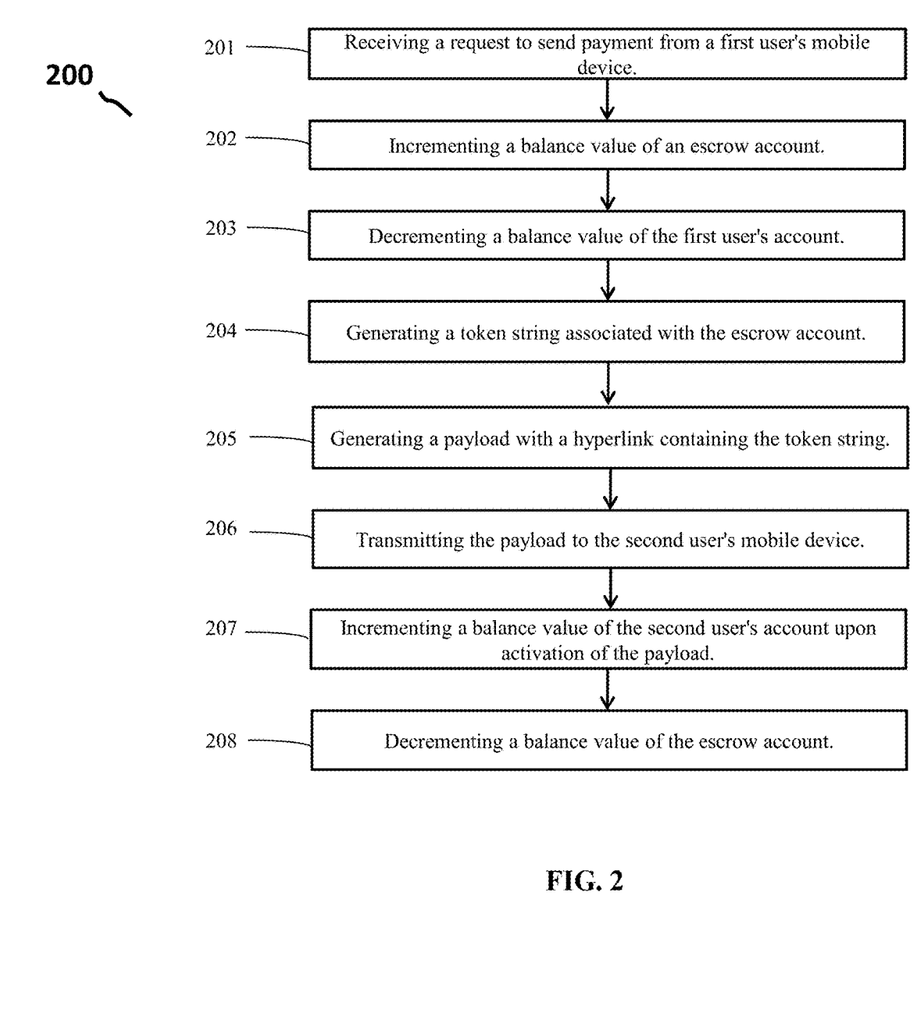
FIG. 2 illustrates a flowchart depicting operational steps of a method for processing a mobile payment request, according to an embodiment.

Referring now to FIG. 2 a flowchart depicting operational steps of a method for processing a mobile payment request is illustrated in accordance with an embodiment. Steps of method 200 may be implemented using one or more modules of the PPS such as the PPS server. FIG. 2 does not imply any limitations with regard to the environments or embodiments that may be implemented. Modifications to the depicted environment or embodiment shown in FIG. 2 may be made.

At step 201, the PPS server may receive a payment request from a payor's mobile device. In this example, the PPS server may receive the payment request from the payor's mobile device's instant message application for initiating a payment. In an embodiment, the payment request may comprise an amount of money to be paid and identification of the payor. The payment request may, in an embodiment, not include any identification of who will receive the payment (i.e., the recipient). The payment request may be received by the PPS server through an instant messaging application installed on the payor's mobile device. In that embodiment, payor's mobile device's instant messaging application is linked, directly or indirectly, to the PPS server and notify the PPS server of any payment requests originated from the payor's mobile device. In other embodiments, the PPS server may receive a payment request through an electronic input source when a payor interacts with the electronic input source to request a payment to be made. Non-limiting examples of an input source may be spoken words (e.g., various speech recognition software), various third-party applications native to payor's mobile device (e.g., third-party instant messaging application or a third-party application from payor's cell phone or other portable devices that support the same or similar operating systems), or inputting a corpus electronically from a computer implemented source such as another electronic device. Operational steps to generate a payment request on a payor's mobile device are described in FIG. 3.

In other embodiments, the payor may directly enter payment request information into a mobile application native to payor's mobile device and in direct communication with the PPS server or designated to communicate with the PPS server. For example, PPS may have a designated mobile application (e.g., the PPS API) for a payor and payment requests may be generated through said application. The PPS server may, in yet another embodiment, automatically identify recurring payments using information from a financial account associated with a payor. For example, if the a payor pays the same amount of money on substantially the same day each month or after a recurring event, then the PPS server may identify that as a recurring payment request. For example, the recurring payment might be $100 for gas and appear around the 10th of every month. After a predetermined number of times for that payment appearing, the PPS server may record the recurring payment in one of databases and expect a similar payment request to be generated every month. In that embodiment, the PPS server may predict a payment request and notify the payor to generate a payment request or pre-fill information regarding the payment request. A payor may also identify payment requests as recurring. In another embodiment, the PPS server, may record a user's activity and previous payment requests in order to simplify payor's generating of the payment request. For example, a payor may scroll through past payment requests in order to see previous transactions. The PPS server may gather data from variety of sources, including but not limited to social networks and other online data sources pertaining personal information of a payor, to predict content of a payment request.

At step 202, the PPS server may generate instructions to increment a balance value of an escrow account. The PPS server may increment the balance value of an escrow account data record in accordance with the payment request. In one example, the escrow account balance value may be incremented using funds in a debit card account, credit card account, savings account, checking account, credit line, or other account (e.g., decrementing payor's account). The escrow account may be an electronic account held by a party associated with the PPS or a third-party on behalf of both transacting parties or the payor. In one embodiment, neither the payor nor the recipient may modify or withdraw money from the escrow account without permission of the PPS. In an embodiment, once the value of an escrow account is incremented, the payor may not decrement the value anymore. In another embodiment, once the value is incremented, payor's access to the escrow account is terminated. In another embodiment, payor may be able to cancel the payment request prior to sending the message and the value of the escrow account may be refunded to the payor. An escrow account may be created for each payment request individually, or in groups. For example payment requests may be grouped based on variety of categories and consequently based on their respective groups all payment requests may use the same escrow account. For instance, in the case of a payor with multiple payment request within a same day, one escrow account with a value of the combined payment requests may be created.

The PPS server, in an embodiment, may only increment the value of the escrow account upon decrementing a financial account associated with the payor. In that embodiment, the PPS server may access payor's account information and determine whether the payor's account balance permits payment request. In that embodiment, the PPS server may search within the user's account (e.g., through payor's linked account information kept in the PPS databases) and decrement payor's account accordingly.

At step 203, the PPS server may generate instructions to decrement a balance value of the payor's account in accordance with the payment request. Decrementing the payor's account may be accomplished using a wide variety of payment methods. For example, decrementing an account may comprise decrementing a bank account stored in the system of record server of a financial institution associated with the payor. In another example, the payor may create a cash account associated with the PPS (e.g., through the PPS API), which is not linked to the payor's bank account, and the cash account may be decremented. In yet another example, decrementing payor's account may be accomplished by charging a credit card or a debit card associated with the payor. The PPS server may also generate a payment authorization query for approval to the financial institute through system of record server and wait for a response from the system of record server to make a determination of whether account associated with a payor has sufficient funds. If the PPS server determines that payor's account balance does not support the payment request, then the PPS server may display a message indicating insufficient funds and/or requesting alternative payment methods. Alternatively, the PPS server may authorize the payment (e.g., incrementing the escrow account) without first verifying whether funds exist in the system of record server. The PPS server may also optionally run a predicted balance of payor's account any time a payor attempts to generate a payment request in order to ensure that payor's account balance will not run below a predetermined threshold value. The PPS server may issue a notification to the payor to confirm the transaction and/or to notify the payor of the possibility that the balance may drop below the predetermined threshold value. The PPS server may either deny the transaction or allow the user to proceed. Furthermore, the PPS server may transmit a message to a third party and display options from a third party to cure the deficiency of the payment request. In one example, the PPS server may present an option for payment from another account. In another example, the PPS server may send an offer to open a line of credit for the payor using a third-party financial institute or a financial institute associated with the PPS. In this example, the payor will have a line of credit, and the amount associated with the payment request may be decremented from an account associated (e.g., either the line of credit account or the payor's account) with the payor at a later time. For example, if a payor requests a payment of $1000, but has an account balance of less than $1000, PPS server may create a line of credit for the payor for $1000 and decrement the payor's account at a later time by $1100 (the payment request amount and a fee associated with creating the line of credit).

Figure 5A:
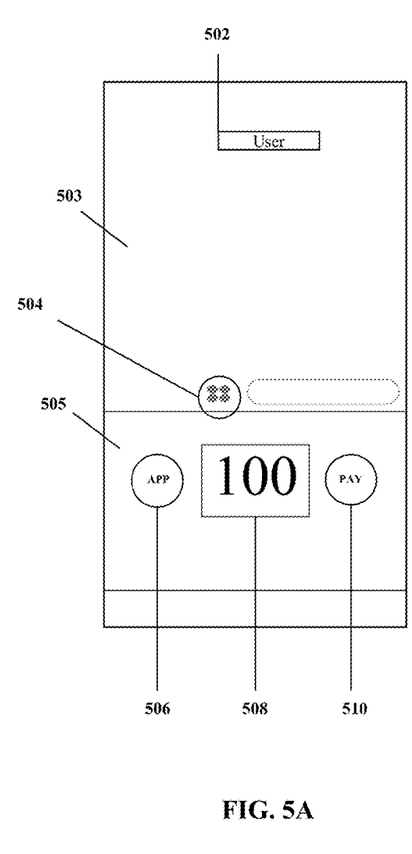
FIG. 5A-F illustrate a graphical user interface (GUI) for generating, transmitting and receiving a mobile payment request, according to an embodiment.
Figure 5B:
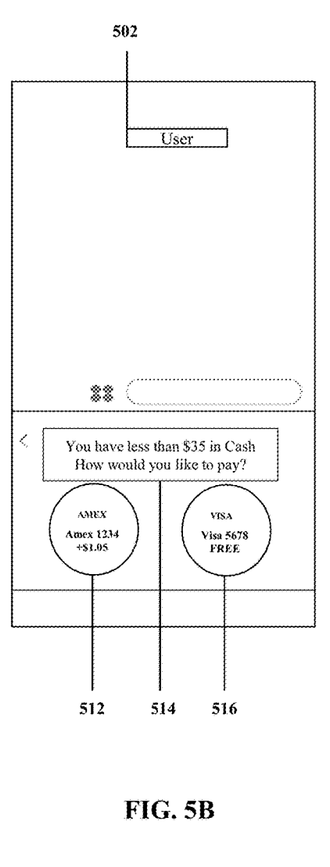
Figure 5C:
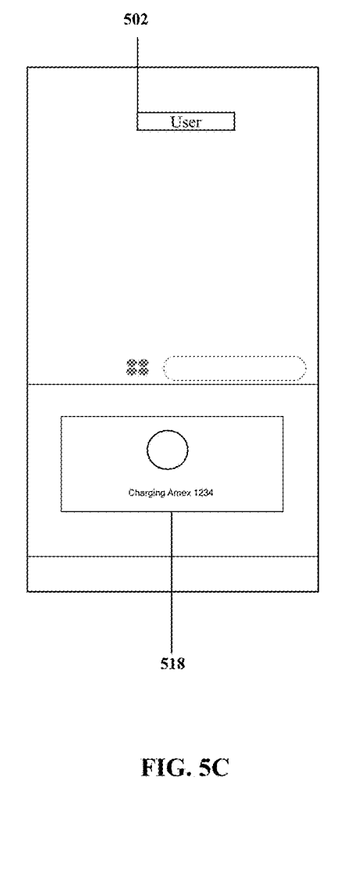

FIG. 5A-C depict a user interface displayed by payor's mobile device in order to generate a payment request. The user interface has a first portion 503, which is used for sending and receiving messages via the instant messaging service application, a second portion 505, which is used for generating a message and interacting with a third party application, and a third portion 506, which is used to load an application such as the PSS API. In this embodiment, payor 501 has generated a payment request for $100. The PPS server generates a payment authorization query to the system of record server. The system of record server communicates with a financial institute associated with payor 501 in order to determine whether payor 501 has sufficient funding to complete the payment request. In this embodiment, the PPS server does not receive authorization from the system of record server for a $100 payment. As a result, PPS server generates instructions for payor's mobile device to display message 514 and options 512 and 516. Message 514 informs payor 501 that payor 501 does not have sufficient funding to complete the payment request. The PPS server also generates instructions to payor's mobile device to display two options (512 and 516) for payor 501 to cure the monetary deficiency. Options 512 and 516 are generated by the PPS server based on payor 501 account information kept in the PPS database. For example payor 501 has previously registered two credit cards with the PPS. In this embodiment, the PPS server generates instructions to payor's mobile device to provide payor 501 with options to cure the funding deficiency using those credit cards. Payor 501 chooses the "Amex" option (option 512). As a result, as depicted in FIG. 5C, the PPS server generates instructions to charge the Amex account associated with payor 501 and generates instructions to payor's mobile device to display message 518 indicating that $100 was charged. In this embodiment, the PPS server creates an individual escrow account for payor 501 payment request. This escrow account is incremented by a value of $100. In other embodiments, the amount incremented from the escrow account and the amount decremented from the user's account may not be the same. An example of this may be found when there is a coupon, promotion, or other incentives. In that example, the PPS server may increment the escrow account by a higher or lower value than the payment request indicates.

At step 204, the PPS server may generate a token string associated with the escrow account data records. At step 205, the PPS server may generate a payload with a hyperlink containing the token string, text instructions, and an image based on the payment request. In the example embodiment, the payload contains a hyperlink including the token string, text instructions, and an image, though the payload is not required to include an image or text instructions. Although an image is used in the example embodiment, it is intended that any media element can be used, such as images (e.g., GIF, JPEG, TIFF, PNG, BMP), videos (e.g., AVI, QuickTime, Windows Media), stickers, ideograms (e.g., EMOJIs), alphanumeric characters, and links to desired websites. Although a hyperlink is used in the example embodiment, any similar functionality to deliver a token may be used that is consistent with this disclosure. The PPS server may generate the token string comprising an alphanumerical string based on a random value generator. A payload is an electronic representation of the payment request and the escrow account, and may contain information regarding the payor, amount of the payment request, and the escrow account. A token, however, may be described as an "opaque identifier" (sometimes associated with or otherwise referred to as an "opaque pointer") of the payload that is used by the recipient to claim a payment and may not contain any information regarding the amount of the payment request. For example, the PPS server may generate a token, which only contains an alphanumerical string based on randomly generated values. As described below, the PPS server may use the information contained within the token to authenticate the activation of the payload. In some embodiments, neither the token, nor the payload contains any information regarding the amount of the payment. In such embodiments, the payor may choose to "gift wrap" the payment and the PPS server may not include any information regarding the payment amount in the token or the payload, or transmit the payment amount information to the recipient's mobile device. The recipient may receive a message containing a payload with no indication of the amount of the payment. Upon successful activation of the payload, the PPS server may transmit a message to the recipient regarding the payment amount, which, in some implementations, may be the first moment the payment amount is revealed to the recipient. The PPS server may generate the data contained within the token using variety of existing methods in order to combat possible fraud. For example, the payment token may include alphanumerical string generated based on a random values. The PPS server may also create a payload comprising the token string, a graphical representation of the amount indicated by the payor to be sent, and text instructions. The payload may be created in a format enabled and configured to be transmitted using an instant message application. For example, the payload may contain an image with embedded data, such as the token or other text instructions.

In another embodiment, the payor's mobile device and the PPS server may cooperate in generating the information of the payload, such that each generates some or all of the information for the payload. For example, the information may be generated at the PPS server in response to a request from the payor's mobile device to generate the payload. For example, the PPS server can generate a token and transmit it back to the mobile device, which then selects an image and assembles a payload to include the token. The PPS server may generate the payload, and the mobile device may add an image to the received payload; or the PPS server may transmit payload contents, and the mobile device may assemble the payload with an image. Alternatively, the mobile device could generate the information locally via a mobile application for display with input from the payor. A person of ordinary skill in the art would understand that the server could generate at least part of the information in response to a request from the payor.

Figure 5D:
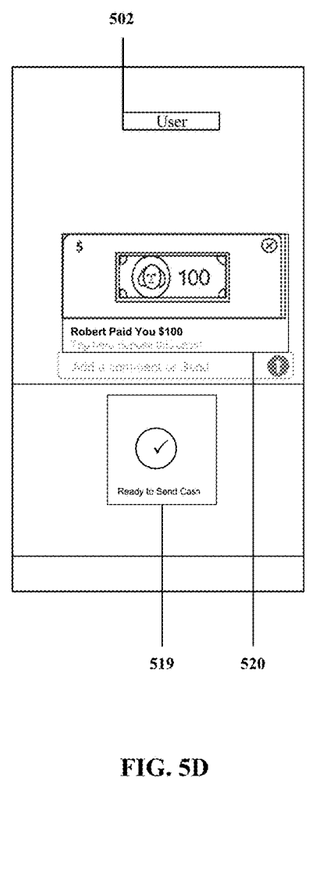

FIG. 5D depicts an embodiment of a payload generated by the PPS server and transmitted to the payor's mobile device. In this embodiment, the PPS server generates payload 520 for payor 501 and the payment request of $100. Payload 520 includes a graphic image representing $100 and information regarding payor 501. For example, payload 520 displays "Robert paid you $100" and instructions for the recipient indicating that the recipient may tap on the payload in order to receive the payment. In another embodiment, payor may add comments or customize the token with other preferences or add special messages. In another embodiment, content of the token is generated such that only the PPS server or a computer system associated with the PPS may be able to identify the data. For example, the PPS server may store content of a token associated with a payment request in the PPS database and, upon activation of the token by the recipient, determine whether the contents of the activated token and the token stored in the PPS database are the same.

At step 206, the PPS server may transmit, or generate instructions to transmit, the payload to the payor's mobile device. The PPS server may transmit the payload to the payor's mobile device for display in a message field in an instant messaging service application where the mobile device is configured to transmit an instant messaging containing the token. In an embodiment, The PPS server may communicate directly with the payor's mobile device or through the PPS API. Furthermore, in an embodiment, the PPS server may not directly send the payload to the recipient because recipient's identity is not known to the PPS server. In an embodiment, as illustrated in FIG. 5D, the PPS server may generate instructions to the payor's mobile device to display the payload is ready to be sent. For example, the PPS server, in this embodiment, generated instructions to the payor's mobile device to display indication 519 to notifying payor 501 that the payload is ready to be sent.

At step 207, the PPS server may receive instructions to increment the recipient's account. The PPS server may increment the recipient's account upon the recipient activating the hyperlink contained within the payload. The PPS server may receive the instruction to increment the recipient's account from either the recipient's mobile device, the payor's mobile device, or a third-party associated with the activation of the payload or the hyperlink contained within. For example, in an embodiment, payor's mobile device may track whether the instant message was transmitted and "seen" by the recipient and upon receiving the instant message containing the payload, payor's mobile device may instruct the PPS server to decrement the escrow account and increment the recipient's account. This embodiment may be performed upon instructions from the payor device for an automatic payment where recipient's authorization or activation is not needed. For example, in that embodiment, payor may choose to make the payment automatic, so the payment will be transferred to the recipient upon the recipient opening the instant message containing the payload. In another embodiment, the instruction to decrement the escrow account and/or increment the recipient's account may be generated by the recipient's mobile device. In that embodiment, recipient may receive an instant message containing the payload and upon activating the payload recipient's mobile device may send, using a network, the instructions to the PPS server. A non-limiting example of activating a payload may be tapping or clicking the payload, activating the hyperlink, or visiting a Uniform Resource Locator ("URL") embedded within the payload.

In an embodiment, the recipient's mobile device may activate the payload by launching a web browser and navigating the web browser to a destination represented by the hyperlink contained within the token in order to send an HTTP(S) request to the PPS server. The HTTP(S) request may be transmitted over the Internet or other communication networks, such as the mobile device communication network. In some implementations, the PPS server may store the token content in the PPS database. For example, while generating an alphanumerical string for the token, the PPS server may keep a record of the payload, the payor, and the associated alphanumerical string within the token. Upon, the recipient activating the payload, the PPS server may receive the content of the token (e.g., the alphanumerical string) and compare the activated token content with the stored token content. The PPS server may authenticate the activation of the payload by comparing the stored token content and the activated token content. Upon a positive match, the PPS server may further generate instructions to a financial institute to increment the recipient's account and decrement the escrow account. In some cases, when the content of the activated token and the stored content of the token are not the same, then the PPS server may be configured to deny the payment request or generate an instruction to transmit a message to the payor mobile device indicating a failed payment. Alternatively, the recipient's mobile device may utilize the PPS API native to an application installed and executed by the recipient's mobile device to communicate with the PPS server to activate the hyperlink, as an alternative to navigating to a web server URL using a web browser. In such cases, the PPS API instructs the recipient's mobile device on communication formats and standards associated with the PPS server and local application. As such, recipient's mobile device may use the PPS API to activate the hyperlink and transmit the token content directly to the PPS server, in a format that conforms with the PPS server data formats, without using a web browser. This method for payload activation may be faster because it does not require the recipient to leave the messaging application. Upon receiving the content of the activated token, the PPS server may authenticate the content using the same method as described above. The PPS server may use the activation of the token via the PPS API as the default method and use the token activation via a web browser when the recipient's mobile device does not have the PPS API installed.

In another embodiment, payor may customize the payload activation by requiring the recipient to enter a code or other authorization methods. For example, payor may require the recipient to enter a four-digit code to activate the payload. As another example of fraud protection, the activation process and the hyperlink creation may be done in a manner that clicking the URL will only result in activation of the payload within the context of the received instant message environment. For example, if the URL is copied and pasted into a web-browser, clicking on the link will not activate the payload.

At step 208, the PPS server may generate instructions to decrement the escrow account. In an embodiment, upon receiving instructions from the recipient's mobile device regarding the activation of the payload, the PPS server may communicate with a financial institution associated with the recipient (either directly or through the system of record server) in order to increment recipient's account. The PPS server may also receive identification information from the recipient's mobile device and identify the recipient using existing data stored in the PPS databases. If the PPS server does not have any existing stored financial information regarding recipient's accounts, the PPS server may generate a message to the recipient, inquiring such information. For example, the PPS server may ask the recipient to insert an account for the payment to be transmitted to. Alternatively, the PPS server may modify payment dates (the date that the incrementing of the recipient account occurs) based on payor's preferences, instructions, or a predicted balance. For example, payor may, when generating the payload, indicate that the payment to the recipient should be delayed by a certain time or date. As a result, the PPS server may not decrement the escrow account or increment the recipient's account until the time condition asserted by the payor is satisfied. In another example, if a predicted balance is below the predetermined amount, the PPS server may attempt to notify the payor, or the recipient in order to avoid payor's account dropping below a predetermined amount.

Figure 5E:
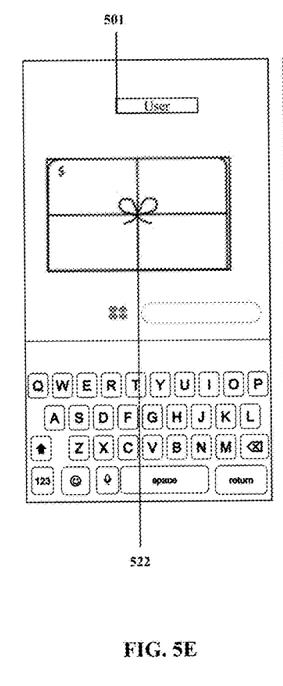
Figure 5F:
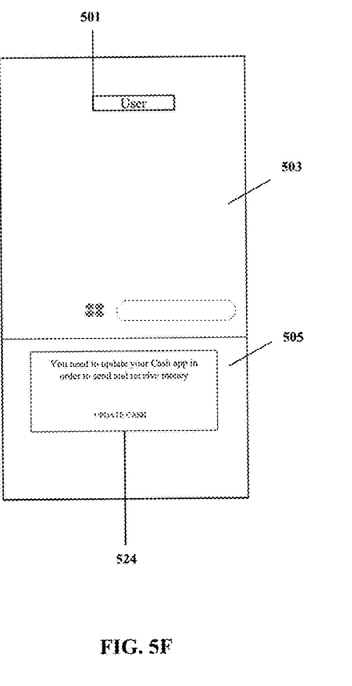

FIG. 5E-F depict a user interface for receiving a payload on the recipient's mobile device. In this embodiment, recipient 502, receives payload 522 using an instant messaging application native to the recipient's mobile device. On the recipient's mobile device, the user interface has a first portion 503, which is used for sending and receiving messages via the instant messaging service application, and a second portion 505, which is used for generating a message and interacting with a third party application. Upon request of payor 501, payload 522 is graphically different than payload 520. Payload 522 does not include a graphic image that reveals the amount of the payment to recipient 502. Recipient 502, activates payload 522 by tapping on the image. Upon this activation, the PPS server is notified and receives an instruction to increment an account associated with recipient 502. The PPS server searches within the PPS database and does not find any information associated with recipient 502. As a result, server 104 displays message 524 indicating that recipient 502 must update financial information of the PPS API (e.g., Cash App or an account associated with the recipient). Upon recipient 502 updating the requested information, the PPS server in the depicted embodiment, increments an account associated with recipient 502 and decrements the escrow account associated with the payment request. The PPS server may also send a confirmation to payor's mobile.

Figure 3:
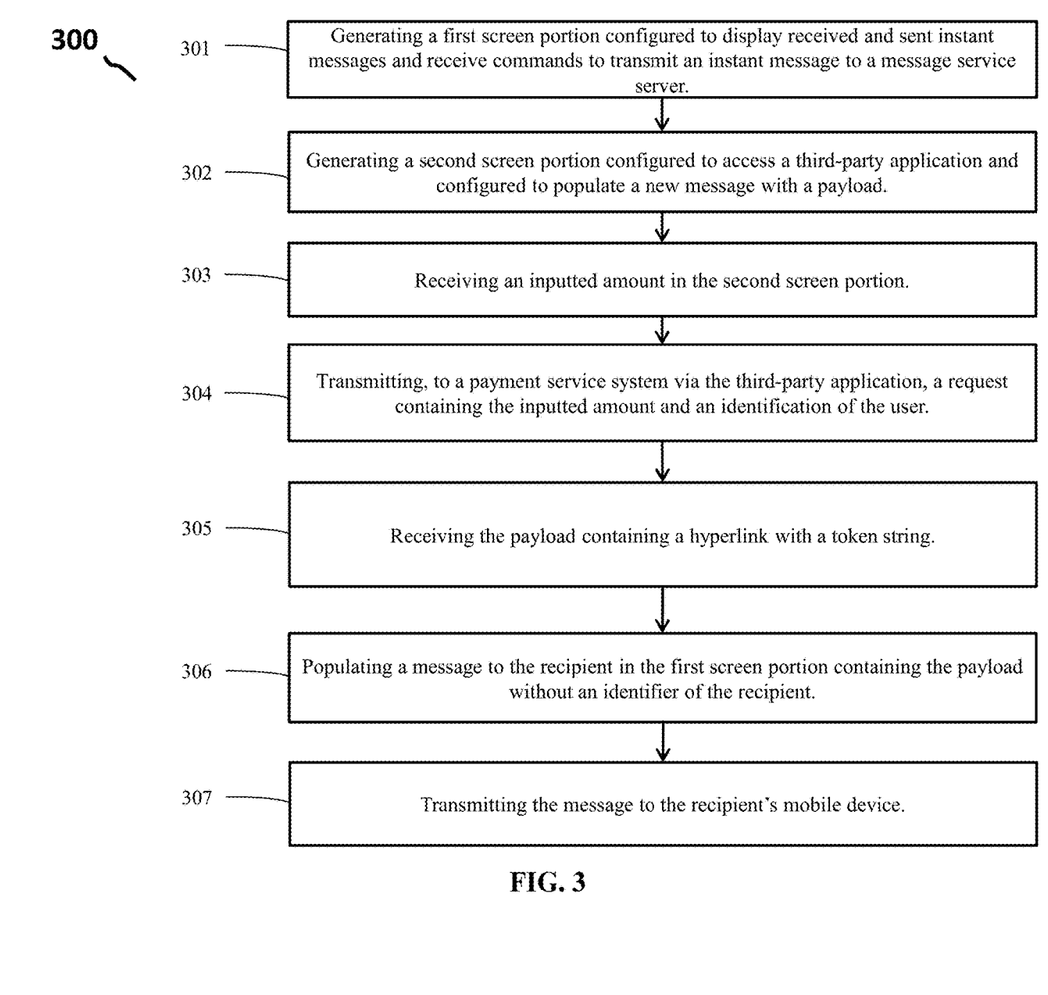
FIG. 3 illustrates a flowchart depicting operational steps of a method for generating a mobile payment request, according to an embodiment.

Referring now to FIG. 3 a flowchart depicting operational steps of a method for generating and transmitting a payload is illustrated in accordance with an embodiment. Steps of method 300 may be implemented using one or more modules of a computing system such the mobile device server. The mobile device server may generate instructions to payor's mobile device or the recipient's mobile device, or communicate with the PPS server as depicted in FIG. 1. FIG. 3 does not imply any limitations with regard to the environments or embodiments that may be implemented. Modifications to the depicted environment or embodiment shown in FIG. 3 may be made.

At step 301, the mobile device server may generate instructions to the payor's mobile device to display a first screen portion configured to display received and sent instant messages and receive commands to transmit an instant message to a message service server. The mobile device server may use an instant messaging application/platform native to a particular operating system for payor's mobile device. Alternatively, the mobile device may use another third-party instant messaging or other communication application that is not native to the operating system of the mobile device. FIG. 5A is an example of a user interface displayed on payor's mobile device based on instructions from the mobile device server. In this embodiment, payor's mobile device is instructed, by the mobile device server, to generate a screen portion such as FIG. 5A, which indicates that payor 501 may communicate with recipient 502 via an instant messaging application.

At step 302, the mobile device server, may generate instructions for the payor's mobile device to display a second screen portion configured to access a third-party application and configured to populate a new message with a payload and at step 303, the mobile device server may receive an inputted amount in the second screen portion. Payor's mobile device may indicate to the payor mobile device is capable of communication with a third party application (such as PPS API) in order to generate messages with a payload by displaying a graphic icon or sending a notification to the payor. Mobile payor's mobile device may also receive an inputted amount from the payor s indicating an amount for a payload.

FIG. 5A depicts an embodiment for a user interface, displayed on payor's mobile device, in order to generate a payment request. In this embodiment, payor 501 is using a mobile device that is configured to send and receive instant messages and enabled to communicate with the PPS server or other third party applications. In the depicted embodiment, the instant messaging application is linked with an application that could directly communicate with the PPS server. Payor's mobile device indicates to payor 501 that the instant messaging application is enabled to communicate with the PPS server or an application directly linked to the PPS (e.g., the PPS API) in order to create and transmit a payload by displaying graphic 504. In the depicted embodiment, payor 501 indicates an inclination to initiate a payment request by tapping/clicking on graphic 504. Upon receiving this indication, the PPS server, generates instructions to payor's mobile device to display boxes 508, and 510. Box 508 indicates the amount of the payment request and is configured to receive input from payor 501 for modification of the amount. Box 510 inquires confirmation that a payment for the amount disclosed in box 508 may be sent to the PPS server. In the embodiment depicted in FIG. 5A, payor 501 chooses $100 to send to recipient 502 and clicks on box 510 in order to confirm the payment request.

In an embodiment, third portion 506 displays to the payor 501 an option to be transferred to or open a user interface of the mobile application directly in communication with the PPS server (e.g., PPS API) in order to modify several options such as payment method, account information, or other user preferences. In an embodiment, payor 501 may activate the third portion 506 by clicking or tapping on the graphic icon presented in the third portion 506. Upon payor 501 activating the third portion 506, the PPS API may be loaded. At step 304, the mobile device server may transmit, to the PPS, a request containing the inputted amount and an identification of the payor. As described in FIG. 2 (step 201), payor's mobile device may, receive instructions from the mobile device server, to use the PPS network or any other communication methods to communicate with the PPS server. In another embodiment, payor's mobile device may use the PPS API to communicate with the PPS server. The PPS server may receive a payment request from payor's mobile device. The payment request may comprise information regarding payment (e.g., methods of payment, and amount of payment) and user identification (e.g., name and other information associated with the payor for the PPS server to identify an account associated with the payor). In the embodiment depicted in FIG. 5A-E, payor's mobile device sends a payment request for $100 to the PPS server and includes information associated with payor 501. In an embodiment, payor's mobile device may not send any information regarding the recipient to the PPS server. For example in the depicted embodiment, payor's mobile device does not send any information regarding recipient 502 to the PPS server.

Furthermore, the mobile device server may also transmit other user preferences with the payment request. In an embodiment, a payor may choose from a pre-generated list of payload images or choose to create a new payload image. In another embodiment, a payor may choose to not have any image or text associated with the payload. The information (e.g., an image or text) may be collected by the mobile device and added to the payload after receiving the token from the PPS server. For example, a payor may (manually or automatically) choose an image depicting a $100 bill for a payment request of $100 or customize an image based on the amount of the payment request, such as the image represented in payload 520. The mobile device generates a payload using a token from the PPS server, text instructions, and the selected image. In other embodiments, a payor may upload an image locally using the payor's mobile device or from a network (e.g., mobile device server). In one configuration, the mobile device server may receive the image from the mobile device and transmit the image to the PPS server, and receive a payload containing that image. In another configuration, the mobile device may select an image, transmit the image to the PPS server, and the PPS server may generate the payload and transmit it to the mobile device. Additionally, a payor may change the image after receiving the payload containing the image. In that example, a payor may change the payload image, or the text instructions, before sending the payload using the instant messaging application. In another embodiment, the payor may choose to add other media elements to the payload.

At step 305, the mobile device server may receive a payload containing a hyperlink with a token string, an image based on the inputted amount of a payment request, and instructions for payment. As explained in FIG. 2 (steps 204-5), the PPS server may generate a payload containing a token string and other payment information and transmit the payload to the payor's mobile device using a variety of communication methods namely the PPS network.

At step 306, mobile device server may generate instructions to payor's mobile device to populate a message to the recipient in the first screen portion containing the payload without an identifier of the recipient. Payor's mobile device may, upon receiving payload 520, generate a screen portion such as the screen portion depicted in FIG. 5D, which includes information regarding the recipient 502, payload 520, and an indication such as indication 519 that conveys to payor 501 that payload 520, in form of a text message, is ready to be sent. In the depicted embodiment, payor's mobile device populates this message within the context of the same instant messaging application as depicted in FIG. 5A. In other embodiment, the message contains the payload and may be populated within a different instant messaging application native to payor's mobile device. This may be due to differences within user preferences (payor or recipient) or due to difference between operating devices associated with mobile devices of the payor and the recipient. For example, if the payor has a mobile device with an iOS operating system and the recipient has a mobile device with an Android operating system. Payor's mobile device may generate a message to the payor indicating that the payload may not be sent or, because iOS and Android use different instant messaging applications, populate the message containing the payload within a third party instant messaging application native to both mobile devices.

At step 307, mobile device server may transmit the instant message containing the payload to the recipient's mobile device. The payor's mobile device may use variety of communication methods to communicate with recipient's mobile device in order to transmit the message, containing the payload, to recipient's mobile device. In the depicted environment, payor's mobile device and recipient's mobile device both utilize the iOS operating system. As mentioned previously, payor's mobile device often cannot or will not send the payload directly to the recipient's mobile device via the PPS network; rather, the payor's mobile device indirectly communicates the payload to the recipient's mobile device via the mobile device network. As a result, the PPS may not receive any information regarding the recipient until the payload is activated and accessed by the recipient mobile device. In some implementations, the payor's mobile device may transmit a recipient identifier to the PPS server. The recipient identifier may contain information regarding the recipient's mobile device, the payor's mobile device, recipient's account, and/or other information regarding the payment request. The recipient identifier maybe unique or may help identify each device. Non-limiting examples of such identifiers may include unique device identifier (UDID), media access control (MAC) address or identifier, phone number, user ID, and manufacturing serial number, among others. For example, a recipient identifier may include the phone number of the payor and the amount of the payment request. The PPS server may, upon a successful and authenticated activation of a payload, add relevant information regarding the recipient to the recipient identifier. In other words, information associated with the recipient may be transmitted to the PPS server and the recipient is no longer "unknown" to the PPS server after receiving the first payment because the PPS server may store the identifying information for the recipient mobile device. In some implementations, the PPS server may utilize the recipient identifier in a fraud prevention system. For example, the PPS server may track recipient identifiers for a particular payor over time and develop a pattern for the payor's payments (e.g., a payor pays $100 on the same day of the month to someone having the same recipient identifier). In that example, the PPS server may deny a similar transaction to a person having a different recipient identifier.

Figure 4:
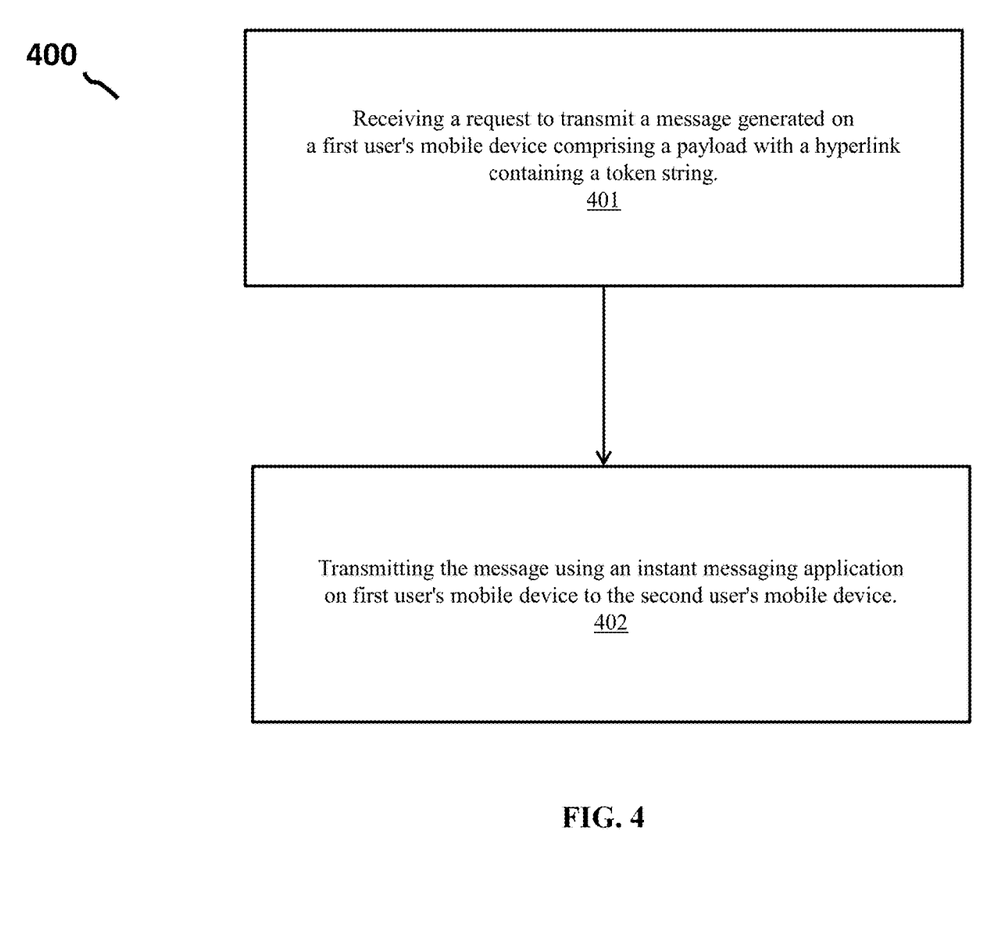
FIG. 4 illustrates a flowchart depicting operational steps of a method for a receiving and transmitting a mobile payload, according to an embodiment.

Referring now to FIG. 4, a flowchart depicting operational steps of a method for transmitting a message containing a payload is illustrated in accordance with an embodiment. Steps of method 400 may be implemented using one or more modules of a mobile device server or a network such as the mobile device network. FIG. 4 does not imply any limitations with regard to the environments or embodiments that may be implemented. Modifications to the depicted environment or embodiment shown in FIG. 4 may be made.

At step 401 the mobile device network may receive a request to transmit a message generated on a payor's mobile device comprising a payload with a hyperlink containing a token string, image based on a payment request amount, and text instructions for receiving a payment to a recipient where the payload does not include the recipient's identification.

Generation and customization of payloads and tokens are described in FIG. 2 and FIG. 3. The mobile device server may host an instant messaging platform that is used by both the payor's mobile device and the recipient's mobile device. The mobile device network may receive an instruction from a mobile device such as the payor's mobile device to transmit a message that contains a payload on said instant messaging platform. In an embodiment, the mobile device network may only receive an identifier for the recipient such as a phone number and not any other information regarding the payload. For example, the mobile device network will receive identification (e.g., phone number) of the recipient as a part of the instructions to deliver the text message; however, the mobile device network will not receive information regarding the content of instant message. In an embodiment, the mobile device network may treat the payload as a black box being delivered without knowing the content of the black box. At step 402, the mobile device network may transmit, the message using an instant messaging application on payor's mobile device to the recipient's mobile device. The mobile device network may use an instant messaging application platform native to both payor and recipient's mobile devices. In an embodiment, while the content of the token may not be encrypted, the message may contain sensitive information regarding the payor and the recipient. In that embodiment, rather than encrypt portions or all of the payload content, the PPS server may rely on security procedures and protocols native to the mobile device network; for instance, the mobile device network may encrypt some or all of the message portions (e.g., payload) when the message is generated and transmitted to the recipient mobile device. Therefore, the mobile device network may encrypt the message to ensure proper and safe transmission. The PPS server may then rely on that fraud protection method and increment an account associated with a device that has activated the payload.

Although certain illustrative, non-limiting exemplary embodiments have been presented, various changes, substitutions, permutations, and alterations may be made without departing from the scope of the appended claims. Further, the steps of the methods described herein may be carried out in any suitable order, or simultaneously where appropriate. Thus, the scope of the disclosure should not necessarily be limited by this description.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, may refer to the action and processes of a data processing system, or similar electronic device that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments may relate to an apparatus for performing one or more of the functions described herein. This apparatus may be specially constructed for the required purposes, or it may comprise a special purpose computer selectively activated or reconfigured by a computer program stored in the computer. Such a computer program may be stored in a machine (e.g., computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions for operations on a processor, and each coupled to a bus.

The exemplary embodiments described herein are described as software executed on at least one server, though it is understood that embodiments may be configured in other ways and retain functionality. The embodiments may be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein may be used to implement the systems and techniques according to this disclosure.

The exemplary embodiments may relate to an apparatus for performing one or more of the functions described herein. This apparatus may be specially constructed for the required purposes or be selectively activated or reconfigured by computer executable instructions stored in non-transitory computer memory medium or non-transitory computer-readable storage medium.

It is to be appreciated that the various components of the technology may be located at distant portions of a distributed network or the Internet, or within a dedicated secured, unsecured, addressed/encoded or encrypted system. Thus, it should be appreciated that the components of the system may be combined into one or more devices or co-located on a particular node of a distributed network, such as a telecommunications network. As will be appreciated from the description, and for reasons of computational efficiency, the components of the system may be arranged at any location within a distributed network without affecting the operation of the system. Moreover, the components could be embedded in a dedicated machine.

Furthermore, it should be appreciated that the various links connecting the elements may be wired or wireless links, or any combination thereof, or any other known or later developed element(s) that is capable of supplying or communicating data to and from the connected elements. The term "module" as used herein may refer to any known or later developed hardware, software, firmware, or combination thereof that is capable of performing the functionality associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Presently preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation may be combined with one or more features of any other implementation.

What is claimed is:

1. A computer-implemented method for processing a payment request from a client mobile device executing an instant messaging service application, the method comprising:
   receiving, by a messaging server, a request to transmit a payment message generated by the instant messaging service application executing on a first user's client mobile device to a second user's client mobile device,
      wherein the request comprises the payment message and a second user identifier,
      wherein the payment message comprises a payload including a hyperlink containing a token string, text instructions, and an image based upon a payment amount,
      wherein the payload does not comprise the second user identifier,
      wherein a payment processing server generates the token string comprising alphanumerical values based on a randomly generated value and transmits the payload to a payment application executing on the first user's client mobile device that inserts the payload in a message field of the instant messaging service application,
      wherein the token string is associated with an escrow account data record, and
      wherein the hyperlink of the payload comprises a uniform resource locator that is configured, upon a selection of the hyperlink of the payload, to instruct the payment processing server to increment an account data record of the second user and decrement the escrow account data record in accordance with the payment amount when the hyperlink is selected; and
   transmitting, by the messaging server, the payment message in the instant messaging service application executing on the first user's client mobile device to an instant messaging service application executing on the second user's client mobile device associated with the second user identifier,
      wherein the messaging server hosts the instant messaging service application executing on the first user's client mobile device and the instant messaging service application executing on the second user's client mobile device.

2. The computer-implemented method according to claim 1, wherein the image does not depict an amount based upon the payment amount.

3. The computer-implemented method according to claim 1, wherein the instant messaging service application is native to an operating system of the first user's client mobile device.

4. The computer-implemented method according to claim 1, wherein the instant messaging service application is not native to an operating system of the first user's client mobile device.

5. The computer-implemented method according to claim 1, wherein the payload is configured to be activated based on interaction of the second user with the instant messaging service application executing on the second user's client mobile device.

6. A computer-implemented method for processing a payment request from a client mobile device executing a messaging service application, the method comprising:
   receiving, by a messaging server, a request to transmit a payment message generated by the messaging service application executing on a first user's client mobile device to a second user's client mobile device,
      wherein the request comprises the message and a second user identifier,
      wherein the payment message comprises a payload containing a token string, wherein the payload does not comprise the second user identifier,
      wherein a payment processing server generates the token string comprising alphanumerical values based on a randomly generated value and transmits the payload to a payment application executing on the first user's client mobile device that inserts the payload in a message field of the messaging service application,
      wherein the token string is associated with an escrow account data record, and
      wherein the hyperlink of the payload comprises a uniform resource locator that is configured, upon a selection of the hyperlink of the payload, to instruct the payment processing server to increment an account data record of the second user and decrement the escrow account data record in accordance with the payment amount when the hyperlink is selected; and
   transmitting, by the messaging server, the payment message from the messaging service application executing on the first user's client mobile device to a messaging service application executing on the second user's client mobile device associated with the second user identifier, wherein the messaging server hosts the messaging service application executing on the first client mobile device and the messaging service application executing on the second user's client mobile device.

7. The computer-implemented method according to claim 6, wherein the token string is embedded in a hyperlink.

8. The computer-implemented method according to claim 6, wherein the payload is configured to be activated based on interaction of the second user with a third-party messaging service application executing on the second user's client mobile device.

9. The computer-implemented method according to claim 6, further comprising:
   transmitting, by the messaging server, a message from the second user's client mobile device to the first user's client mobile device that the payload has been activated.

10. The computer-implemented method according to claim 6, further comprising:
   generating, by the messaging server, a second image associated with the payload; and
   transmitting, by the messaging server, the payment message from the first user's client mobile device to the second user's client mobile device associated with the second user identifier, wherein the payload further comprises the second image.

11. A non-transitory computer-readable storage medium storing instructions that, when executed by a computing system, cause the computing system to perform operations comprising:
   receiving, by a messaging server, a request to transmit to a second user's client mobile device a payment message generated by a messaging service application executing on a first user's client device,
      wherein the request comprises the payment message and a second user identifier,
      wherein the payment message comprises a payload including a hyperlink containing a token string and an image based upon a payment amount,
      wherein the payload does not comprise the second user identifier,
      wherein a payment processing server generates the token string comprising alphanumerical values based on a randomly generated value and transmits the payload to a payment application executing on the first client mobile device that inserts the payload in a message field of the messaging service application,
      wherein the token string is associated with an escrow account data record, and
      wherein the hyperlink of the payload comprises a uniform resource locator that is configured, upon a selection of the hyperlink of the payload, to instruct the payment processing server to increment an account data record of the second user and decrement the escrow account data record in accordance with the payment amount when the hyperlink is selected; and
   transmitting, by the messaging server, the payment message in the messaging service application executing on the first user's client mobile device to a messaging service application executing on the second user's client mobile device associated with the second user identifier,
      wherein the messaging server hosts the messaging service application executing by the first user's client mobile device and the messaging service application executing on the second user's client mobile devices.

12. The computer-readable storage medium according to claim 11, wherein the image does not depict an amount based upon the payment amount.

13. The computer-readable storage medium according to claim 11, wherein the messaging service application is native to an operating system of the first user's client mobile device.

14. The computer-readable storage medium according to claim 11, wherein the messaging service application is not native to an operating system of the first user's client mobile device.

15. The computer-readable storage medium according to claim 11, wherein the payload is configured to be activated based on interaction of the second user with the messaging service application executing on the second user's client mobile device.

16. The computer-readable storage medium according to claim 11, wherein the payload is configured to be activated based on interaction of the second user with a third-party messaging service application executing on the second user's client mobile device.

17. The computer-readable storage medium according to claim 11, further comprising:
   transmitting, by the messaging server, a message from the second user's client mobile device to the first user's client mobile device that the payload has been activated.

18. The computer-readable storage medium according to claim 11, further comprising:
   generating, by the messaging server, a second image associated with the payload; and
   transmitting, by the messaging server, the payment message from the first user's client mobile device to the second user's client mobile device associated with the second user identifier, wherein the payload further comprises the second image.

19. A system for processing a payment request from a client mobile device comprising:
   a messaging server, comprising a memory, and a processor, configured to:
      receive a request to transmit to a second user's client mobile device a payment message generated by a messaging service application executing on the first user's client device,
         wherein the request comprises the payment message and a second user identifier,
         wherein the payment message comprises a payload including a hyperlink containing a token string and an image based upon a payment amount,
         wherein the payload does not comprise the second user identifier,
         wherein a payment processing server generates the token string comprising alphanumerical values based on randomly generated values and transmits the payload to a payment application executing on the first user's client mobile device that inserts the payload in a message field of a messaging service application executing on the first user's client mobile device,
         wherein the token string is associated with an escrow account data record, and
         wherein the hyperlink of the payload comprises a uniform resource locator that is configured, upon a selection of the hyperlink of the payload, to instruct the payment processing server to increment an account data record of the second user and decrement the escrow account data record in accordance with the payment amount when the hyperlink is selected; and transmit the message from the messaging service application executing on the first user's client mobile device to a messaging service application executing on the second user's client mobile device associated with the second user identifier, wherein the messaging server hosts the messaging service application executing on the first user's client mobile device and the messaging service application executing on the second user's client mobile device.

20. The system according to claim 19, wherein the image does not depict an amount based upon the payment amount.

21. The system according to claim 19, wherein the messaging service application is native to an operating system of the first user's client mobile device.

22. The system according to claim 19, wherein the messaging service application is not native to an operating system of the first user's client mobile device.

23. The system according to claim 19, wherein the payload is configured to be activated by the second user's client mobile device.

24. The system according to claim 19, wherein the payload is configured to be activated based on interaction of the second user with a third-party messaging service application executing on the second user's client mobile device.

25. The system according to claim 19, wherein the messaging server is further configured to transmit a message from the second user's client mobile device to the first user's client mobile device that the payload has been activated.

26. The system according to claim 19, wherein the messaging server is further configured to:

generate a second image associated with the payload; and transmit the payment message from the first user's client mobile device to the second user's client mobile device associated with the second user identifier, wherein the payload further comprises the second image.

* * * * *